(12) United States Patent
Bauch et al.

(10) Patent No.: US 12,112,636 B2
(45) Date of Patent: Oct. 8, 2024

(54) METHOD AND CONTROL UNIT FOR DETECTING A VEHICLE MOVING IN OR OUT

(71) Applicant: Bayerische Motoren Werke Aktiengesellschaft, Munich (DE)

(72) Inventors: Dominik Bauch, Muehldorf am Inn (DE); Marco Baumgartl, Gilching (DE); Michael Himmelsbach, Munich (DE); Josef Mehringer, Gmund (DE); Daniel Meissner, Friedberg (DE); Luca Trentinaglia, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 422 days.

(21) Appl. No.: 17/422,573

(22) PCT Filed: Jan. 30, 2020

(86) PCT No.: PCT/EP2020/052277
§ 371 (c)(1),
(2) Date: Jul. 13, 2021

(87) PCT Pub. No.: WO2020/177958
PCT Pub. Date: Sep. 10, 2020

(65) Prior Publication Data
US 2021/0387617 A1 Dec. 16, 2021

(30) Foreign Application Priority Data
Mar. 5, 2019 (DE) ...................... 10 2019 105 547.4

(51) Int. Cl.
*G08G 1/16* (2006.01)
*B60W 30/09* (2012.01)
(Continued)

(52) U.S. Cl.
CPC ............ *G08G 1/167* (2013.01); *B60W 30/09* (2013.01); *B60W 30/0956* (2013.01);
(Continued)

(58) Field of Classification Search
None
See application file for complete search history.

(56) References Cited

U.S. PATENT DOCUMENTS

2012/0303258 A1 11/2012 Pampus et al.
2013/0325306 A1 12/2013 Caveney et al.
(Continued)

FOREIGN PATENT DOCUMENTS

DE 10 2004 013 818 A1 10/2005
DE 10 2009 045 286 A1 4/2011
(Continued)

OTHER PUBLICATIONS

Machine translation of JP2004268829 (Year: 2024).*
(Continued)

*Primary Examiner* — Aniss Chad
*Assistant Examiner* — Jennifer M Anda
(74) *Attorney, Agent, or Firm* — Crowell & Moring LLP

(57) ABSTRACT

A control unit for a vehicle is designed to predict a driving tube for the vehicle, which driving tube surrounds a motion path ahead of the vehicle. The control unit detects an object ahead, for example a vehicle moving in or out. The control unit determines a reference point on the object and determines overlap information regarding overlap of the reference point with the driving tube. The control unit determines, on the basis of the overlap information, whether the object is penetrating into the driving tube of the vehicle.

16 Claims, 2 Drawing Sheets

(51) Int. Cl.
  *B60W 30/095* (2012.01)
  *B60W 40/04* (2006.01)
  *B60W 40/105* (2012.01)
  *B60W 40/12* (2012.01)
  *B60W 50/00* (2006.01)
  *G06V 20/56* (2022.01)
  *G06V 20/58* (2022.01)

(52) U.S. Cl.
  CPC .......... *B60W 40/04* (2013.01); *B60W 40/105* (2013.01); *B60W 40/12* (2013.01); *B60W 50/0097* (2013.01); *G06V 20/58* (2022.01); *G06V 20/584* (2022.01); *G06V 20/588* (2022.01); *B60W 2552/53* (2020.02); *B60W 2554/4041* (2020.02); *B60W 2554/4046* (2020.02); *B60W 2554/806* (2020.02)

(56) References Cited

U.S. PATENT DOCUMENTS

| | | | |
|---|---|---|---|
| 2017/0236422 A1 | 8/2017 | Naka et al. | |
| 2019/0072971 A1* | 3/2019 | Kato | G05D 1/0214 |
| 2020/0081441 A1* | 3/2020 | Kizumi | G05D 1/0088 |

FOREIGN PATENT DOCUMENTS

| | | |
|---|---|---|
| DE | 10 2010 064 277 A1 | 6/2012 |
| DE | 10 2012 111 846 A1 | 6/2013 |
| DE | 10 2015 121 353 A1 | 6/2017 |
| JP | 2004268829 A * | 9/2004 |
| JP | 2012-221452 A | 11/2012 |
| JP | 2013-506893 A | 2/2013 |
| JP | 2014-67196 A | 4/2014 |
| JP | 2016-71566 A | 5/2016 |
| JP | 2018-97644 A | 6/2018 |

OTHER PUBLICATIONS

Japanese-language Office Action issued in Japanese Application No. 2021-549817 dated Aug. 31, 2022 with English and German translation (12 pages).

Korean-language Office Action issued in Korean Application No. 10-2021-7025361 dated Apr. 3, 2023 with English translation (nine (9) pages).

Winner, H. et al., "Handbuch Fahrerassistenzsysteme", Grundlagen, Komponenten und Systeme für aktive Sicherheit und Komfort, 2015, pp. 869-872, ISBN 978-3-658-05734-3.

International Search Report (PCT/ISA/210) issued in PCT Application No. PCT/EP2020/052277 dated May 26, 2020 with English translation (seven (7) pages).

German-language Written Opinion (PCT/ISA/237) issued in PCT Application No. PCT/EP2020/052277 dated May 26, 2020 (eight (8) pages).

German-language Search Report issued in German Application No. 10 2019 105 547.4 dated Dec. 4, 2019 with partial English translation (13 pages).

* cited by examiner

METHOD AND CONTROL UNIT FOR DETECTING A VEHICLE MOVING IN OR OUT

BACKGROUND AND SUMMARY OF THE INVENTION

The invention relates to a method and to a control unit for detecting a vehicle moving into or out of a lane. In particular, the invention relates to the reliable detection of vehicles moving in or out as part of a driver assistance system for a vehicle that is traveling in an at least partially automated manner.

A vehicle can comprise a driver assistance system or a driving function that can perform the longitudinal and/or the transverse guidance of the vehicle in an at least partially automated manner. An example of a driver assistance system or of a driving function is a distance and/or speed controller (or adaptive cruise control (ACC)), in the case of which the vehicle automatically observes a specific speed and/or a specific distance from a front vehicle traveling in front of the vehicle.

To provide such a driver assistance system in a vehicle (also referred to as the ego vehicle), it is typically necessary to detect another vehicle that is moving into the driving lane of the vehicle, for example in order to no longer operate the cruise control with the front vehicle as the control object but with the vehicle moving into the lane as the control object.

In particular if driving lanes are difficult to detect or do not exist, a vehicle moving into the driving lane of the ego vehicle can typically not be reliably detected. The present document relates to the technical problem of enabling detection of a vehicle moving in or out in a more efficient and reliable manner, in particular if no driving lane can be detected.

The problem is achieved by each of the independent claims. Advantageous embodiments are described, inter alia, in the dependent claims. It should be noted that additional features of a patent claim that is dependent on an independent patent claim can form, without the features of the independent patent claim or only in combination with a subset of the features of the independent patent claim, a separate invention independent of the combination of all the features of the independent patent claim, and the invention can be made the subject matter of an independent claim, divisional application, or a subsequent application. This equally relates to technical teachings described in the description, which are able to form an invention that is independent of the features of the independent patent claims.

According to one aspect, a control unit for a vehicle (in particular for a motor vehicle) is described. The control unit is configured to predict a driving tube (travel envelope) for the vehicle surrounding an upcoming movement path of the vehicle. The movement path of the vehicle can indicate the trajectory of a point (e.g. a point on the front or rear axle) of the vehicle. The driving tube can enclose the movement path (right and left). It is possible to determine a driving tube and/or movement path for a specific upcoming region (e.g. for the next 500 meters or less, or for the next 200 meters or less). Alternatively or in addition, a driving tube and/or movement path can be determined for a specific upcoming time region (e.g. for the next 20 seconds or less or for the next 10 seconds or less).

The driving tube and/or the movement path of the vehicle can be determined for example on the basis of the vicinity data with respect to a vicinity of the vehicle (laterally and in front of the vehicle). The vicinity data can for example be captured by one or more vicinity sensors (e.g. an image camera, a radar sensor, a lidar sensor, and/or an ultrasonic sensor) of the vehicle. Alternatively or in addition, the driving tube and/or the movement path of the vehicle can be determined on the basis of vehicle data with respect to the driving direction, the steering angle, and/or the driving speed of the vehicle. The vehicle data can be captured by one or more vehicle sensors (e.g. a speed sensor, an acceleration sensor, a steering sensor, et cetera) of the vehicle. Alternatively or in addition, the driving tube and/or the movement path of the vehicle can be determined on the basis of a digital map with respect to a course of a road on which the vehicle travels.

The driving tube and/or the movement path of the vehicle can here be determined independently of a driving lane marking on the road on which the vehicle is traveling. In other words, even if, or in particular if no, driving lane markings can be detected on a road that is currently being traveled, it is possible to determine a driving tube and/or a movement path of the vehicle on the basis of the above-mentioned data. For example, the control unit can be configured to check or determine whether or not a driving lane marking of a driving lane or road on which the vehicle is traveling can be detected. If it is determined that no driving lane marking can be detected, it is possible (instead) to predict a driving tube (in order to carry out the method described in this document).

The width of the predicted driving tube around the movement path of the vehicle can depend on the width of the vehicle. Alternatively or in addition, the width of the predicted driving tube can depend on the distance of a region of the driving tube from a current position of the vehicle. Typically the width of the driving tube expands as the distance from the current position of the vehicle increases. Alternatively or in addition, the width of the predicted driving tube can depend on the uncertainty with which a point of the movement path can be determined. In this case, the width of the driving tube expands typically as the uncertainty increases.

The control unit can furthermore be configured to detect an object located in front. The object can be detected for example on the basis of vicinity data. The object can comprise or be an (other) vehicle that is moving in or out in front of the vehicle.

In addition, the control unit is configured to determine a reference point on or at the object. For this purpose, a contour model for a contour of the object can be determined based on the vicinity data. In other words, it is possible to determine a model by way of which the contour of the object is described or simulated in a simplified manner. The contour model can comprise or be for example a polygon, in particular a quadrangle or rectangle, having a multiplicity of corners. The reference point can then be efficiently determined as a point of the contour model. In particular, the control unit can be configured to select the reference point as a corner from the multiplicity of corners of a polygon describing the contour of the object. Owing to the representation of an object by a (possibly by a single) reference point, the relevance of an object for the driving trajectory of a vehicle and/or for a driving function or for a driver assistance system of the vehicle can be determined in an efficient and reliable manner.

The control unit is furthermore configured to determine overlap information with respect to the overlap of the reference point with the driving tube. The overlap information can indicate in particular how closely the reference point is to the driving tube of the vehicle. This can be expressed by an overlap value, wherein the overlap value can lie between a minimum value and a maximum value, to indicate in each case different degrees of proximity or overlap. It is thus possible to determine, as overlap information, how closely the reference point of the object is to the driving tube.

It should be noted that an increasing overlap value can indicate an increasing proximity to the driving tube (first variant). In an alternative example, an increasing overlap value can indicate (in the exact reverse) an increasing distance from the driving tube (second variant). The second variant in this document will be frequently reproduced in parentheses. Consequently, a relatively small overlap value (e.g. zero) in the second variant indicates a relatively strong overlap with the driving tube, while a relatively large overlap value (e.g. 1) indicates a relatively small overlap with the driving tube.

In addition, the control unit is configured to determine, on the basis of the overlap information, whether or not the object enters the driving tube of the vehicle. As is shown further above, the overlap information can indicate or comprise an overlap value of the reference point. The control unit can be configured to compare the overlap value with at least one threshold value in order to determine whether or not the object enters the driving tube of the vehicle. For example, it is possible to determine that the object enters the driving tube of the vehicle if the overlap value is greater than a first threshold value. On the other hand, it is possible to determine that the object does not enter the driving tube of the vehicle if the overlap value is smaller than a second threshold value. This applies to the first variant of the overlap values. Corresponding comparisons with threshold values can be performed for the second variant.

It is thus possible to determine in a precise and efficient manner whether or not a detected object (in particular a vehicle that is moving in or out) should be taken into account for a driving function of a vehicle (even if no driving lane markings can be detected on a currently traveled road).

The control unit can be configured to operate a driving function of the vehicle depending on whether or not a determination was made that the object enters the driving tube of the vehicle. Alternatively or in addition, the control unit can be configured to guide the vehicle in an at least partially automated manner independently of whether a determination was made that the object enters the driving tube of the vehicle or not. The quality of a driving function or of the driver assistance system can thus be increased.

The control unit can be configured to determine a reference position of the reference point relative to the driving tube. The reference position can here be located on a vertical line that is perpendicular to the movement path and extends through the reference point. An overlap value can then be determined for the reference point on the basis of an overlap profile and on the basis of the reference position as the overlap information.

The overlap profile can indicate different overlap values for different positions relative to the driving tube. The overlap value can in this case decrease (or increase) as the distance from the driving tube increases. The overlap profile can here assume for example overlap values between a minimum value (e.g. 0) and a maximum value (e.g. 1). The overlap profile can, for example in a tolerance zone adjoining the driving tube, transition continuously from the maximum value to the minimum value of the overlap value (or vice versa) as the distance from the driving tube increases. Furthermore, the overlap profile in the driving tube can have the maximum value (or the minimum value).

The width of the tolerance zone can depend for example on the driving speed of the vehicle (and can increase as the driving speed increases). Alternatively or in addition, the width of the tolerance zone can depend on the distance of a region of the tolerance zone from a current position of the vehicle. Typically, the width of the tolerance zone increases as the distance from the current position of the vehicle increases. Alternatively in addition, the width of the tolerance zone can depend on the uncertainty with which a point of the movement path can be determined. The width of the tolerance zone here typically increases as the uncertainty increases.

It is possible by taking into account an overlap profile to determine the overlap information in a robust manner so as to make reliable detection of a relevant object possible.

The control unit can be configured to determine uncertainty information with respect to a degree of uncertainty of the reference position. The uncertainty information can indicate in particular how strongly the actual position of the object can deviate from the reference position of the reference point. The overlap value of the reference point can then be determined on the basis of the uncertainty information. By taking into account uncertainty information, the reliability of the detection of a relevant object can be increased further.

In particular, the control unit can be configured to determine a value region (e.g. a standard deviation) around the reference position of the reference point on the basis of the uncertainty information. A maximum (or a minimum) overlap value can then be determined for the value region around the reference position on the basis of the overlap profile. The overlap value of the reference point that is to be used can then be determined in a particularly robust manner on the basis of the determined maximum (or minimum) overlap value.

The control unit can be configured to determine an overlap value in each case for a plurality of possible points of the object. The reference point of the object can then be selected from the plurality of possible points depending on the overlap values for the plurality of possible points. In particular, the point that has the relatively highest (or the relatively lowest) overlap value with the driving tube can be selected from the plurality of points. Consequently, it is possible to select that point as a reference point that has the strongest overlap with the driving tube. In this way, particularly reliable detection of a relevant object can be made possible.

The control unit can be configured to determine a vertical line that is perpendicular to the movement path and extends through the reference point as the cross section through the driving tube. The overlap profile can then be determined as a function of the overlap value extending along the vertical line as a function of the position on the vertical line. By taking into account a vertical line, the position of the reference point relative to the driving tube can be determined in a precise manner.

The control unit can in particular be configured to determine a plurality of differently aligned vertical lines through the reference point (wherein each of the vertical lines is perpendicular to the movement path of the vehicle). A corresponding plurality of overlap profiles can then be determined for the plurality of vertical lines. A corresponding plurality of possible overlap values of the reference point with the driving tube can then be determined based on the plurality of overlap profiles. The overlap value of the reference point can then be determined in a precise and robust manner based on the plurality of possible overlap values. In particular, the overlap value can be determined as a maximum (or minimum) possible overlap value from the plurality of possible overlap values.

According to a further aspect, a (road) motor vehicle (in particular a passenger car or a truck or a bus or a motorcycle) comprising the control unit described in this document is described.

According to a further aspect, a (computer-implemented) method for detecting an object that is relevant for a driving function of a vehicle is described. The method comprises predicting a driving tube lying around an upcoming movement path of the vehicle. The movement path can here indicate the trajectory of a specific point (e.g. the center point of an axle) of the vehicle. In addition, the method comprises detecting an object that is located in front. The method furthermore comprises determining a reference point at the object and determining overlap information with respect to an overlap of the reference point with the driving tube. The method furthermore comprises determining, based on the overlap information, whether or not the object enters the driving tube of the vehicle.

According to a further aspect, a software (SW) program is described. The SW program can be configured to be executed on a processor (e.g. on a controller of a vehicle) and to thereby carry out the method described in this document.

According to a further aspect, a storage medium is described. The storage medium can comprise an SW program, which is configured to be executed on a processor and to thereby carry out the method described in this document.

It should be noted that the methods, apparatuses, and systems described in this document can be used both alone and in combination with other methods, apparatuses, and systems described in this document. Furthermore, any aspects of the methods, apparatuses, and systems described in this document can be combined with one another in many different ways. In particular, the features of the claims may be combined with one another in various ways.

The invention will be described in more detail below with reference to exemplary embodiments.

DETAILED DESCRIPTION OF THE DRAWINGS

Figure 1:
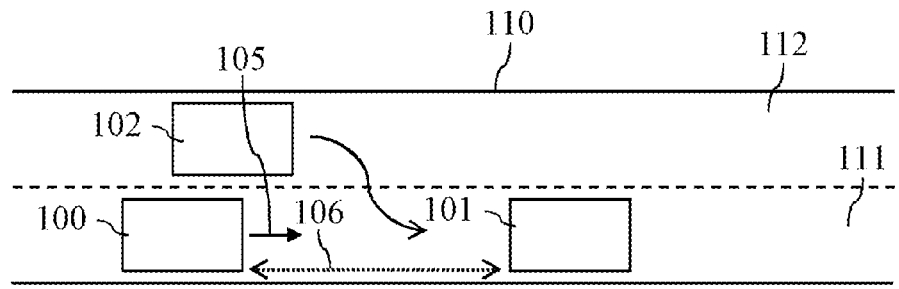
FIG. 1 shows an exemplary driving situation.

As shown in the introductory part, the present document is concerned with detecting a vehicle moving into or out of the lane in a reliable and efficient manner. In this connection, FIG. 1 shows an exemplary driving situation, in which an ego vehicle 100 is driving on an ego driving lane 111 of a multi-lane road 110 behind a front vehicle 101. In the ego vehicle 100, for example a driving function that keeps the ego vehicle 100 at a defined distance 106 from the front vehicle 101 in an automated manner and/or that longitudinally and/or transversely guides the ego vehicle 100 at a specific driving speed 105 in an automated manner, can be operated. The driving function, in particular the adaptive cruise control, can here use the front vehicle 101 as a control object to automatically adapt the driving speed 105 of the ego vehicle 100 (e.g. depending on the distance 106 from the front vehicle 101 and/or depending on the driving speed of the front vehicle 101).

During the operation of the driving function, the situation may arise in which another vehicle 102 moves from an adjacent driving lane 112 onto the ego driving lane 111 between the ego vehicle 100 and the front vehicle 101. The vehicle 102 that is moving in should be detected as early as possible so as to comfortably adapt the driving speed 105 of the ego vehicle 100 to the driving speed of the vehicle 102 that is moving into the lane, and/or to be able to set comfortably a specific distance 106 from the vehicle 102 that is moving into the lane.

Figure 2:
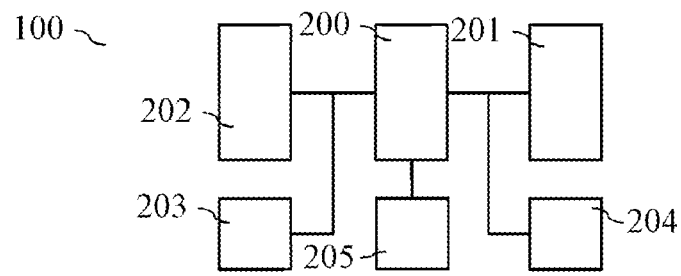
FIG. 2 shows exemplary components of a vehicle.

FIG. 2 shows exemplary components of an (ego) vehicle 100. The ego vehicle 100 comprises one or more vicinity sensors 201, which are configured to capture vicinity data with respect to a vicinity of the vehicle 100. Exemplary vicinity sensors 201 are an image camera, a radar sensor, a lidar sensor, and/or an ultrasonic sensor. A control unit 200 of the vehicle 100 can be configured to detect a lane marking of the ego driving lane 111 of the vehicle 100 based on the vicinity data. Furthermore, the control unit 200 can be configured to detect a vehicle 102 moving onto the ego driving lane 111 based on the vicinity data. In addition, the distance 106 of the ego vehicle 100 from the vehicle 102 that is moving in and/or the driving speed of the vehicle 102 that is moving in can be determined.

The control unit 200 can furthermore be configured to operate one or more longitudinal and/or transverse guidance actuators 202 of the ego vehicle 100 on the basis of a detected vehicle 102 that is moving into the lane, in particular in dependence on the driving speed of the vehicle 102 moving into the lane, and/or in dependence on the distance 106 from the vehicle 102 that is moving into the lane. Exemplary longitudinal and/or transverse guiding actuators 202 are a drive motor, a brake apparatus, and/or a steering apparatus. In particular, the control unit 200 can be configured to operate the one or more longitudinal and/or transverse guiding actuators 202 based on the vicinity data in order to provide a driving function (such as ACC).

Vehicles 102 that are moving into the lane are co-moving road users in any speed ranges that perform a complete, partial, or interrupted change from a secondary lane 112 into the ego driving lane 111 of the ego vehicle 100. It is not important here whether the vehicle 102 that is moving into the lane is moving at a positive or negative longitudinal relative speed (with respect to the driving speed 105 of the ego vehicle 100).

A vehicle 102 that is moving into the lane can have the effect of limiting the movement path planned by the ego vehicle 100 by way of a complete or partial blockade. The vehicle 102 that is moving into the lane can here be understood to be a vehicle that actually blocks the movement path of the ego vehicle 100 and/or a vehicle that moves so closely to the movement path of the ego vehicle 100 that safety distances can no longer be observed or that the driver of the ego vehicle 100 considers the vehicle 102 that is moving into the lane to be an acute safety risk.

A vehicle 102 that is moving into the lane may represent a possible safety risk due to the proximity from the ego vehicle 100 not least because a vehicle 102 that is moving into the lane may possibly be difficult to see due to limitations of the field of view (e.g. due to the A pillar of the ego vehicle 100 or, coming from behind, in the blind spot of the ego vehicle 100), or because a relatively close moving-in procedure can unpleasantly affect the driver of the ego vehicle 100.

Based on the vicinity data of the one or more vicinity sensors 201 of the ego vehicle 100, the position of a detected vehicle 102 that is moving into the lane can be determined. Furthermore, the location of the vehicle 102 that is moving in can be determined in an estimated ego driving lane 111 of the ego vehicle 100 or in an ego driving lane that is marked with lane markings. Detecting an ego driving lane 111, however, cannot typically take place on multi-lane roads 110 without lane markings, in parking lots, and on intersections, or on (unmarked) tarred surfaces, with the result that a vehicle 102 that is moving into the ego driving lane 111 cannot be reliably detected.

The vehicle 100 can comprise one or more vehicle sensors 203, which are configured to capture condition or vehicle data with respect to a condition of the vehicle 100. Examples of states are the longitudinal and/or transverse driving speed, the longitudinal and/or transverse acceleration, the steering angle, and/or the yaw rate of the vehicle 100. Furthermore, the vehicle 100 can comprise a position sensor 204, which is configured to determine position data with respect to a current position of the vehicle 100. Furthermore, the vehicle 100 can comprise a storage unit 205, on which a digital map with respect to a road network on which the vehicle 100 is traveling is stored.

Figure 3A:
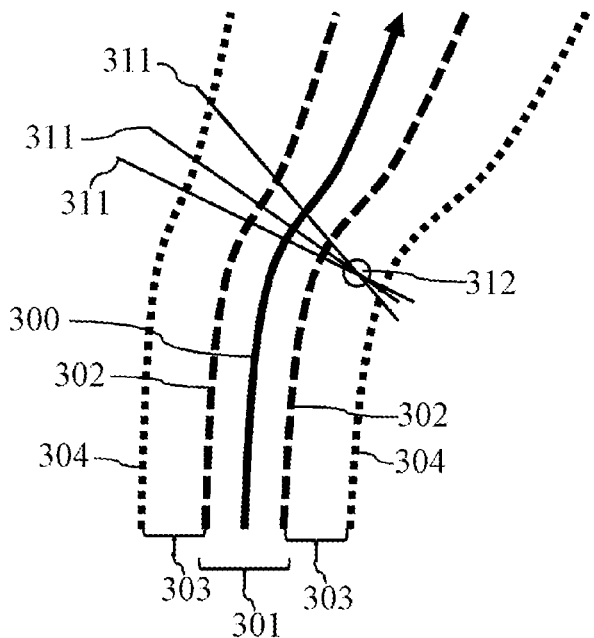
FIG. 3a shows an exemplary driving tube.

The control unit 200 can be configured to predict a movement path 300 of the ego vehicle 100 on the basis of the vicinity data and/or on the basis of the vehicle data and/or on the basis of the position data in connection with the digital map (as illustrated in FIG. 3a). In particular, a driving tube (travel envelope) 301 of the ego vehicle 100 extending around a movement path 300 can be predicted. The driving tube 301 here has driving tube limitations 302 on both sides of the movement path 300.

The movement path 300 can indicate the probable driving trajectory of the ego vehicle 100 in an upcoming road section or spatial interval. The driving tube 301 can enclose the movement path 300. The width of the driving tube 301 can depend on the width of the vehicle 100. Furthermore, the width of the driving tube 301 can depend on the reliability with which a point on the movement path 300 was able to be predicted. Typically, the reliability of a predicted movement path 300 decreases as the distance from the current position of the ego vehicle 100 increases. In order to take into account the increasing uncertainty, the width of the vehicle tube 301 can increase as the distance from the current position of the ego vehicle 100 increases. The vehicle tube 301 can be designed such that it can be assumed with a specific probability (e.g. 50% or more, or 70% or more, or 90% or more) that the ego vehicle 100 would collide with another vehicle 102 entering the vehicle tube 301.

Furthermore, in each case a tolerance zone 303, delimited by respective tolerance delimitations 304, can be defined on each side of the driving tube 301. The tolerance zones 303 can be defined such (e.g. on the basis of the vicinity data, the vehicle data, the position data, and/or the digital map) that there is a probability of collision for a vehicle 102 entering the tolerance zone 303 that lies for example between a minimum value (at the tolerance delimitation 304) and a maximum value (at the driving tube delimitation 302). The minimum value can lie for example between 0% and 10%. The maximum value can lie for example between 40% and 60%. The width of a tolerance zone can increase as the distance from the current position of the ego vehicle 100 increases.

The control unit 200 of the ego vehicle 100 can be configured to determine, on the basis of the vicinity data, whether a vehicle 102 moving in, in particular a specific point (for example a corner of the rear of the vehicle) of a vehicle 102 moving in, enters the predicted driving tube 301 and/or a tolerance zone 303 adjoining the driving tube 301. FIG. 3a shows an exemplary reference point 312 of a vehicle 102 moving into the lane in a tolerance zone 303. The reference point 312 can be that point of the vehicle 102 moving in that is closest to the movement path 300 or to the driving tube 301 of the ego vehicle 100.

For the determined reference point 312 of a vehicle 102 moving in, a set of vertical lines 311 can be determined. In this case, a vertical line 311 is a straight line that extends perpendicular to the movement path 300 through the determined reference point 312 of the vehicle 102 moving in. A vertical line 311 in this case represents a cross-section (perpendicular to the movement path 300) through the driving tube 301 and the adjoining tolerance zones 303.

An overlap profile 320 can be provided for each vertical line 311, that is to say for each cross section, wherein an overlap profile 320 shows the degree or a value 322 of the overlap of a vehicle 102 moving into the lane with the driving tube 301 of the ego vehicle 100 as a function of the position 321 of the determined point 312 of the vehicle 102 moving into the lane on the vertical line 311. The overlap profile 320 can have degrees of overlap or overlap values 322 between a minimum value 332 (e.g. 0) and a maximum value 333 (e.g. 1). The overlap profile 320 outside the tolerance zones 303 can assume the minimum value 332. Furthermore, the overlap profile 320 within the driving tube 301 can assume the maximum value 333. Within a tolerance zone 303, the overlap profile 320 can increase continuously from the minimum value 332 to the maximum value 333.

For a vertical line 311, it is possible to determine the reference position 322 of the detected reference point 312 of a vehicle 102 moving into the lane on the overlap profile 320. In that case, an overlap value 331 is obtained for the detected reference point 312. For the set of vertical lines 311, it is then possible to determine a corresponding set of overlap values 331. It is furthermore possible to determine, in particular predict, based on the set of overlap values 331, whether or not the vehicle 102 that is moving into the lane will enter the driving tube 301 of the ego vehicle 100. A driving function (e.g. for the automated longitudinal and/or transverse guidance) of the ego vehicle 100 can be operated in dependence thereon.

A predicted driving tube 301 can thus be calculated based on an upcoming estimated movement path 300 of the ego vehicle. The driving tube 301 can be obtained from an expansion of the movement path 300 to the left and to the right. This expansion can be variable over the length of the driving tube 301 and may change dynamically, for example in dependence on the own speed 105 of the ego vehicle 100. On both sides outside the driving tube 301, tolerance zones 303 can be assumed, which can likewise be variably switched.

Figure 3B:
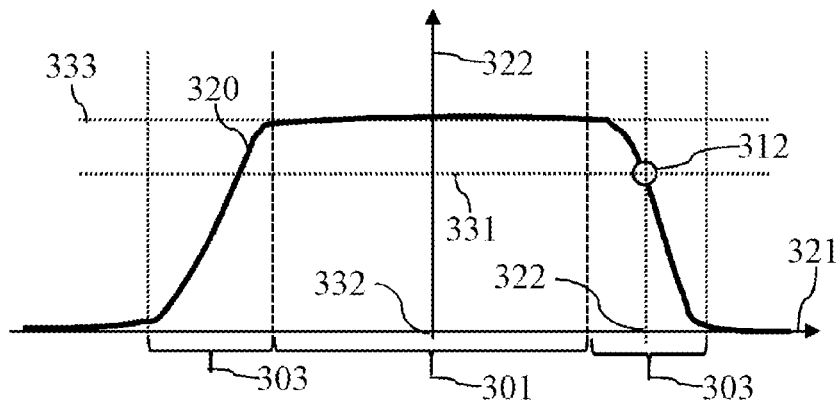
FIG. 3b shows an exemplary overlap profile.

This results in the possibility of calculating for each point P 312 of the plane in the driving direction in front of the ego vehicle 100 whether the point is located within the driving tube 301, in a tolerance zone 303, or outside the tolerance zone 303. Each point P 312 defines one or more vertical lines 311 $L_i$, i=1 ... n, which are perpendicular to the predicted movement path 300 (see FIG. 3a). These vertical lines 311 represent sections through the driving tube 301 and the tolerance zones 303, wherein, on the individual sections, profile curves 320 $K^P_i(x)$ (or overlap profiles) can be defined in the form of scalar functions (see FIG. 3b). These curves 320 can contain the information as to whether a point 312 is located within the driving tube 301 (e.g. value: 1) or is located outside the tolerance zones 303 (e.g. value: 0). In the tolerance zones 303, the values between 0 and 1 can be interpolated such that a qualitative characteristic for the degree of overlap with the driving tube 301 of the ego vehicle 100 is obtained.

For a detected object 102, a reference point 312 R can be determined, having for example the following one or more properties:
- the point 312 lies on the contour of the object 102;
- the point 312 qualifies on the basis of an observation quality exceeding a specific minimum value of the observation quality; and/or
- the point 312 maximizes the driving tube overlap characteristic 320 $F_P$ on the space of all allowed points P of the object 102 and all associated vertical lines 311, i.e. $F_R >= F_P$ for all P of the object 102; in other words, the reference point 312 of the detected object 102 can be selected such that a maximally possible overlap value 331 of the overlap profile 320 is obtained for the reference point 312 for all possible vertical lines 311 (for all possible points of the object 102).

Rather than using a complex object shape for a detected object 102 as the basis, the contour of an object 102 can be approximated by a rectangle. An approximation by point sets, such as the corners, of an object 102 that requires relatively little computational outlay may be used. For example, the possible reference points 312 of an object 102 can be the four corner points of a rectangle approximating the contour of the object 102.

Based on limitations of the sensor system 201 of the ego vehicle 100, an object 102 can have one or more object regions that can be captured relatively poorly or with a relatively low quality. Examples of object regions having a relatively low capturing quality are here object regions which are located outside the field of view of the driver of the ego vehicle 100, which are occluded, and/or which are located on the side of the object 102 that is remote from the sensor. Such object regions are typically subject to greater uncertainties and can therefore be excluded from the consideration as a possible reference point 312 for an object 102.

In a first approximation, the driving tube overlap characteristic $F_P$ of a point 312 P can be calculated as the maximum value of all $K^P_i(x)$ for all vertical lines 311 $L_i$ associated with the point 312 P with position 322 x. If there are position variances, they are taken into account in the calculation. This can be effected by calculating the position standard deviation along the straight lines 311 $L_i$. For example, if the overlap value 331 of a point 312 at the position 321 x is given with a standard deviation $\delta$ on a straight line 311 $L_i$ by $K^P_i(x)$, this value can be increased by the weighted addition of $\delta |d/dx\, K^P_i(x)|$. A driving tube overlap characteristic $F_P$ for the point P can then be determined as $$F_P = \max_i [K^P_i(x) + \alpha \delta |d/dx\, K^P_i(x)|],$$

wherein $\alpha$ is a weighting parameter between 0 and 1, and wherein the square brackets limit the possible value range to 0 to 1.

An object 102 can be assessed as being in overlap with the driving tube 301 of the ego vehicle 100 if its overlap value 331 $F_R$ lies above a first threshold value $S_{in}$ (possibly empirically determined). Accordingly, the object 102 can be assessed as being not in overlap with the driving tube 301 if its overlap value 331 $F_R$ lies below a second threshold value $S_{out}$ (possibly empirically determined).

A driving function of the ego vehicle 100 can then be operated depending on whether an object 102 was classified as being in overlap with the driving tube 301 or not being in overlap with the driving tube 301. In particular, e.g. adaptive cruise control can be realized based on the detected object 102 (in particular the vehicle moving into the lane) if it has been determined that the object 102 overlaps with the driving tube 301. Otherwise, the detected object 102 may be disregarded for the adaptive cruise control.

Figure 4:
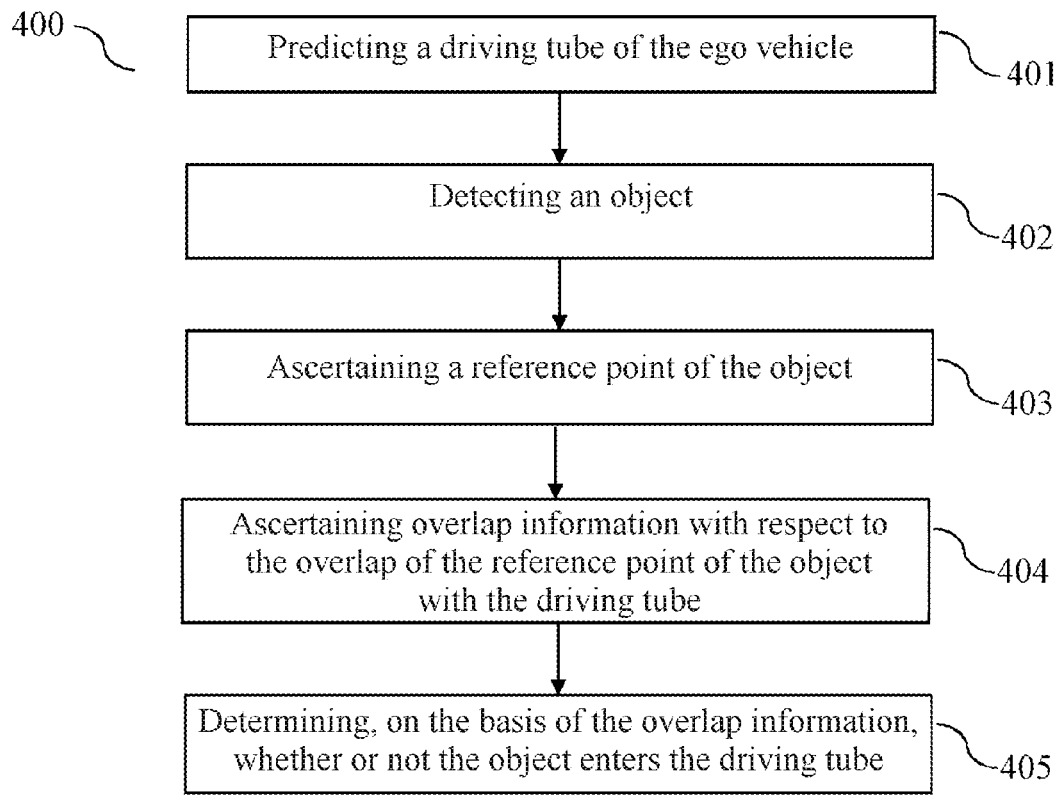
FIG. 4 shows a flowchart of an exemplary method for taking into account a vehicle moving into the lane as part of a driving function of a vehicle.

FIG. 4 shows a flowchart of an exemplary method 400 for detecting an object 102, in particular a vehicle 102 moving into or out of the lane, that is relevant for a driving function of an (ego) vehicle 100. The method 400 can be carried out by a control unit 200 of the vehicle 100.

The method 400 comprises predicting 401 a driving tube 301 for the vehicle 100 lying around an upcoming movement path 300 of the vehicle 100. This can be realized for example based on vicinity data, based on vehicle data, and/or based on a digital map. In this case, the currently traveled road 110 can be such that no road markings can be detected. In other words, the driving tube 301 may be predicted without taking road markings into account.

In addition, the method 400 comprises detecting 402 an object 102 located in front, in particular a vehicle that is moving into or out of the lane. The object 102 can be detected based on vicinity data.

The method 400 furthermore comprises determining 403 an (in particular exactly one) reference point 312 at the object 102. The reference point 312 can here be determined in dependence on the capturing or observation quality of different partial regions of the object 102. In particular, a reference point 312 may be selected only from a partial region of the object 102 for which the capturing or observation quality lies above a predefined quality threshold.

The method 400 furthermore comprises determining 404 overlap information with respect to an overlap of the reference point 312 with the driving tube 301. In particular, the overlap information can indicate the proximity of the reference point 312 to the driving tube 301. For example, the overlap information can have an overlap value 331 that increases as the proximity of the reference point 312 to the driving tube 301 increases (or vice versa).

The method 400 additionally comprises determining 405, on the basis of the overlap information, whether or not the object 102 enters the driving tube 301 of the vehicle 100. A driving function (e.g. for (partially) automated driving) of the vehicle 100 can then be operated depending on whether it has been determined that the object 102 enters the driving tube 301 of the vehicle 100 or not.

With the measures described in this document, it is possible to use not only the position of an object 102 but also geometric object information (which may be incomplete) to detect entry of the object 102 in the driving tube 301 of an ego vehicle 100. It is possible owing to the selection of a suitable reference point 312 to minimize incorrect detections for the object 102. By modeling uncertainties of the driving tube 301 based on profile curves 320 and/or by modeling uncertainties of the position 322 of the reference point 312, the detection rate of objects 102 (in particular of vehicles moving into the lane) can be increased. The method 400 described is here able to be optimized by variation of the weighting parameter $\alpha$, and/or the threshold values $S_{in}$ and $S_{out}$. The flexible choice of the expansion regions of the driving tube 301 and/or of the tolerance zones 303 make varied use possible, for example for detecting road users that are moving into and/or out of the lane.

The present invention is not limited to the exemplary embodiments shown. In particular, it should be noted that the description and the figures are only meant to illustrate the principle of the methods, apparatuses, and systems proposed.

What is claimed is:

1. A control unit for a vehicle, comprising:
the control unit, wherein the control unit is configured to:
predict a driving tube for the vehicle surrounding an upcoming movement path of the vehicle;
provide an overlap profile that shows different overlap values for different positions relative to the driving tube, wherein each of the different overlap values indicates a proximity of each of the different positions to the driving tube;
detect an object located in front of the vehicle, based on vicinity data received from one or more of an image camera, a radar sensor, a lidar sensor, and an ultrasonic sensor;
determine a reference point at the object;
determine a reference position of the reference point relative to the driving tube;
determine, based on the overlap profile and the reference position, an overlap value of the reference point as overlap information with respect to an overlap of the reference point with the driving tube;
determine, based on different overlap information for the different positions, whether the proximity of the reference point to the driving tube increases or not, and thereby determining whether or not the object enters the driving tube of the vehicle; and
control a driving function of the vehicle based on a determination of whether or not the object enters the driving tube of the vehicle, wherein the driving function is configured to adapt the driving speed of the vehicle to the driving speed of the object and/or to set a specific following distance from the object in a case in which the determination is that the object enters the driving tube of the vehicle.

2. The control unit according to claim 1, wherein the control unit is further configured to:
determine, based on the vicinity data, a contour model for a contour of the object; and
determine the reference point as a point of the contour model.

3. The control unit according to claim 2, wherein
the contour model comprises a polygon having a multiplicity of corners, and
the control unit is further configured to select the reference point as a corner from the multiplicity of corners.

4. The control unit according to claim 1, wherein the control unit is further configured to:
determine uncertainty information with respect to a degree of uncertainty of the reference position; and
determine the overlap value of the reference point on the basis of the uncertainty information.

5. The control unit according to claim 4, wherein the control unit is further configured to:
determine, on the basis of the uncertainty information, a value region around the reference position of the reference point;
determine, based on the overlap profile, a maximum or a minimum overlap value for the value region around the reference position; and
determine the overlap value of the reference point on the basis of the determined maximum or minimum overlap value.

6. The control unit according to claim 5, wherein the control unit is further configured to:
determine the overlap value for each of a plurality of points of the object; and
select, from the plurality of points, the reference point in dependence on the overlap values for the plurality of points.

7. The control unit according to claim 6, wherein
the reference point is selected from the plurality of points as the point that has a relatively highest or a relatively lowest overlap value among the overlap values of the plurality of points with the driving tube.

8. The control unit according to claim 1, wherein the control unit is further configured to:
determine a straight line, that is perpendicular to the upcoming movement path and extends through the reference point, as a cross section through the driving tube; and
determine the overlap profile as a function of the overlap value extending along the straight line as a function of the position on the straight line.

9. The control unit according to claim 8, wherein the control unit is further configured to:
determine a plurality of differently aligned vertical lines through the reference point;
determine for the plurality of vertical lines a corresponding plurality of overlap profiles; and
determine, on the basis of the plurality of overlap profiles, a corresponding plurality of possible overlap values of the reference point with the driving tube; and
determine the overlap value of the reference point on the basis of the plurality of possible overlap values, wherein the overlap value of the reference point is determined as a maximally or minimally possible overlap value from the plurality of possible overlap values.

10. The control unit according to claim 1, wherein
the overlap profile in a tolerance zone adjoining the driving tube transitions continuously from a maximum value to a minimum value of the overlap value as the distance from the driving tube increases, or vice versa, and/or
the overlap profile in the driving tube has the maximum value or the minimum value.

11. The control unit according to claim 1, wherein
the control unit is further configured to compare the overlap value with at least one threshold value in order to determine whether or not the object enters the driving tube of the vehicle.

12. The control unit according to claim 1, wherein the control unit is further configured to:
guide the vehicle in an at least partially automated manner in dependence on whether it has been determined that the object enters the driving tube of the vehicle or not.

13. The control unit according to claim 1, wherein
the control unit is further configured to determine the driving tube and/or the upcoming movement path of the vehicle based on:
the vicinity data with respect to a vicinity of the vehicle;
vehicle data with respect to a driving direction and/or driving speed of the vehicle; and/or
a digital map with respect to a course of a road on which the vehicle is traveling; and/or
the control unit is configured to determine the driving tube and/or the upcoming movement path of the vehicle independently of a driving lane marking of a road on which the vehicle is traveling.

14. The control unit according to claim 1, wherein a width of the driving tube around the upcoming movement path of the vehicle is dependent on:
- a width of the vehicle;
- a distance of a region of the driving tube from a current position of the vehicle; and/or
- an uncertainty with which an upcoming point of the upcoming movement path can be determined.

15. The control unit according to claim 1, wherein the object comprises another vehicle that is moving into or out of a lane in front of the vehicle.

16. A method for detecting an object that is relevant for a driving function of a vehicle, the method comprising:
- predicting a driving tube for the vehicle surrounding an upcoming movement path of the vehicle;
- providing an overlap profile that shows different overlap values for different positions relative to the driving tube, wherein each of the different overlap values indicates a degree of proximity of each of the different positions to the driving tube;
- detecting an object located in front of the vehicle, based on vicinity data received from one or more of an image camera, a radar sensor, a lidar sensor, and an ultrasonic sensor;
- determining a reference point at the object;
- determining a reference position of the reference point relative to the driving tube;
- determining, based on the overlap profile and the reference position, an overlap value of the reference point as overlap information with respect to an overlap of the reference point with the driving tube;
- determining, based on different overlap information for the different positions, whether the proximity of the reference point to the driving tube increases or not, and thereby determining whether or not the object enters the driving tube of the vehicle; and
- controlling a driving function of the vehicle based on a determination of whether or not the object enters the driving tube of the vehicle, wherein the driving function is configured to adapt the driving speed of the vehicle to the driving speed of the object and/or to set a specific following distance from the object in a case in which the determination is that the object enters the driving tube of the vehicle.

* * * * *